United States Patent
Chen et al.

(10) Patent No.: US 8,832,750 B2
(45) Date of Patent: Sep. 9, 2014

(54) MEDIA SYNCHRONIZATION WITHIN HOME NETWORK USING SET-TOP BOX AS GATEWAY

(75) Inventors: David W. Chen, Ashburn, VA (US);
Vipul B. Patel, Great Falls, VA (US);
Kenneth L. Gould, Reston, VA (US);
Jian Yu, Ashburn, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 28 days.

(21) Appl. No.: 13/468,451

(22) Filed: May 10, 2012

(65) Prior Publication Data

US 2013/0305292 A1    Nov. 14, 2013

(51) Int. Cl.
*H04N 7/18* (2006.01)
*H04N 7/173* (2011.01)
*H04N 7/16* (2011.01)

(52) U.S. Cl.
USPC ............. 725/80; 725/82; 725/133; 725/153

(58) Field of Classification Search
None
See application file for complete search history.

(56) References Cited

U.S. PATENT DOCUMENTS

| | | | |
|---|---|---|---|
| 6,240,555 B1* | 5/2001 | Shoff et al. | 725/110 |
| 6,349,410 B1* | 2/2002 | Lortz | 725/110 |
| 6,567,984 B1* | 5/2003 | Allport | 725/110 |
| 7,974,316 B2* | 7/2011 | Takashimizu et al. | 370/535 |
| 8,359,399 B2* | 1/2013 | Landow et al. | 709/231 |
| 8,370,878 B2* | 2/2013 | Gharachorloo et al. | 725/62 |
| 2002/0138851 A1* | 9/2002 | Lord et al. | 725/133 |
| 2002/0162120 A1* | 10/2002 | Mitchell | 725/135 |
| 2007/0089158 A1* | 4/2007 | Clark | 725/135 |
| 2009/0199098 A1* | 8/2009 | Kweon et al. | 715/716 |
| 2011/0271318 A1* | 11/2011 | Dakss et al. | 725/142 |
| 2012/0011550 A1* | 1/2012 | Holland | 725/78 |
| 2013/0167173 A1* | 6/2013 | Davis et al. | 725/37 |

* cited by examiner

*Primary Examiner* — Chris Parry
(74) *Attorney, Agent, or Firm* — Chapin IP Law, LLC

(57) ABSTRACT

Techniques disclosed herein include systems and methods for transmitting TV program related content to IP connected devices on a home network, or other local area network. Users can watch television while simultaneously receiving content related to TV programs currently being displayed on a television. TV centric and TV program related content can be transmitted to IP connected devices. Moreover, this TV program related content can be displayed at the same time as a television program is being displayed on a television. As such, the system can provide media synchronization within home network using the set-top box as a gateway for delivering the content. Users can watch TV at home, and at the same time receive TV program related content on a laptop, tablet computer, mobile phone, etc.

20 Claims, 6 Drawing Sheets

MEDIA SYNCHRONIZATION WITHIN HOME NETWORK USING SET-TOP BOX AS GATEWAY

BACKGROUND

The present disclosure relates to multimedia entertainment, and particularly to television programming delivery.

For decades, the set-top box has been the center of home entertainment systems. In general, set-top boxes are computing devices that receive television signals from an external signal source, and then use a tuner or other mechanism to convert the television signals into audio-visual content, which can then be displayed on a connected television screen. Set-top boxes are commonly used by cable television, fiber optic television, and satellite television companies as a means of converting television signals into displayable content. Set-top boxes respond to user input, such as from a remote control, to change channels, record shows, modify display configuration, etc. Thus, using a set-top box, users can enjoy television programming from various channels.

SUMMARY

The set-top box model for viewing television has limitations. For example, because television delivery is a broadcast model, there is typically little room for interactivity with the viewer. The viewer is essentially limited to viewing content that other viewers of a same television channel are viewing. As set-top boxes increase in CPU power and memory, television service providers try to supply additional information such as advertisements, news alerts, electronic alert system (EAS), and program guide information. Apart from advances in the set-top box, there is increasing use of personal computers, laptop computers, tablet computers, smart phones, and other IP connected devices. Such use of personal devices often competes with television programming.

Techniques disclosed herein include systems and methods for transmitting TV program related content to IP connected devices on a home network or other local area network. Users can watch TV at home, while simultaneously receiving content related to TV programs they are currently watching or that are currently being displayed. Thus, TV centric and TV program related content can be transmitted to IP connected devices.

One embodiment includes a synchronization manager that executes a television content synchronization process or system. The synchronization manager receives a request to receive synchronization data corresponding to a specific television channel. The request is received from an electronic device, such as a tablet computer or mobile phone, etc. The request is received at a set-top box that includes circuitry for processing television signals into content displayable on a television, such as a cable TV set-top box. The set-top box receives television signals from an external source. These television signals correspond to television channel programming, such as for displaying conventional television shows. The television signals include embedded synchronization data. The synchronization manager extracts the synchronization data from the received television signals. The extracted synchronization data corresponds to the specific television channel to which the set-top box is currently tuned. The synchronization manager then transmits the synchronization data to the electronic device via a router of a local area network. Thus, the set-top box delivers a display signal to a connected television set, while separating out embedded data and transmitting the embedded data to one or more local IP connected devices over a home or local area network, which can include wireless transmission.

In another embodiment, an electronic device, such as a tablet or laptop computer, transmits a request to receive synchronization data corresponding to a specific television channel. This electronic device, such as an IP connected device, transmits the request towards a set-top box. The set-top box is configured for processing television signals into content displayable on a television. The electronic device includes circuitry that connects to an IP network and displays multimedia content. The electronic device then receives synchronization data from the set-top box via a router of a local area network. The synchronization data has been embedded in a television signal received at the set-top box. The television signal corresponds to the specific television channel to which the set-top box is tuned. The electronic device then displays the content, from the synchronization data, on the electronic device such that the displayed content appears synchronized with audio and video content of television programming corresponding to the specific television channel.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform (or causes the processor to perform) the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), a field-programmable gate array (FPGA), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: receiving a request, from an electronic device, to receive synchronization data corresponding to a specific television channel, the request received at a set-top box, the set-top box including circuitry that processes television signals into content displayable on a television; receiving television signals at the set-top box from an external source, the television signals corresponding to television channel programming, the television signals including synchronization data embedded in the television signals; extracting the synchronization data from the received television signals, the synchronization data corresponding to the specific television channel to which the set-top box is currently tuned; and transmitting the synchronization data to the electronic device via a router of a local area network. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations.

As discussed above, techniques herein are well suited for use in software applications supporting television content synchronization. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Techniques disclosed herein include systems and methods for transmitting TV program related content to IP connected devices on a home network, or other local area network. Users can watch TV at home, while simultaneously receiving content related to TV programs they are currently watching or that are currently being displayed. Thus, TV centric and TV program related content can be transmitted to IP connected devices. Moreover, this TV program related content can be displayed at about the same time as a television program is being displayed on a television. As such, the system can provide media synchronization within a home network using the set-top box as a gateway for delivering the content. In other words, users can watch TV at home, and at the same time receive TV program related content on a laptop, tablet computer, mobile phone, etc., while the user is watching TV.

Figure 1:
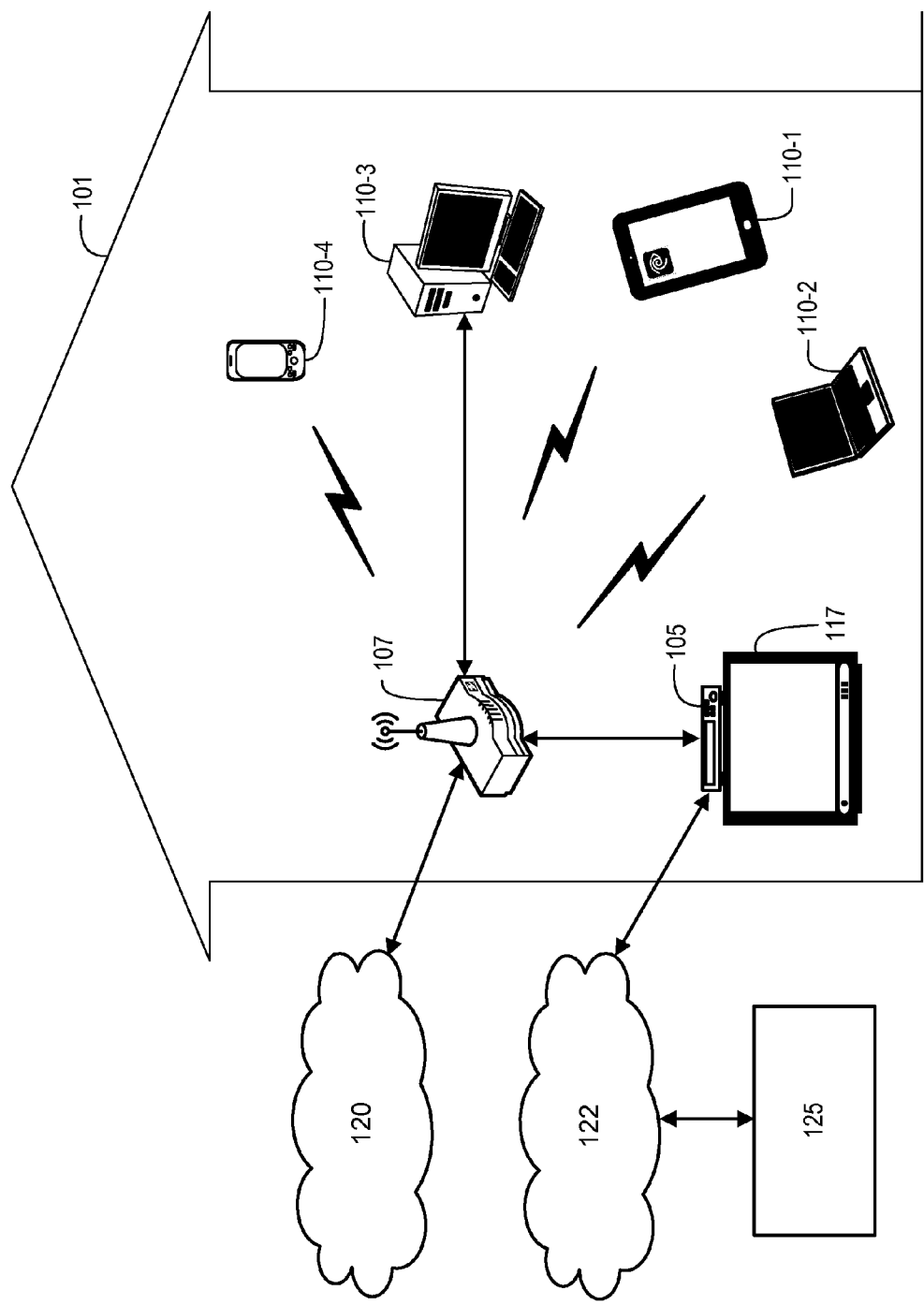
FIG. 1 is a block diagram of a home network using a synchronization manager according to embodiments herein.

Referring now to FIG. 1, a diagram illustrates a synchronization manager operating in a home network or local area network. This includes set-top box 105, which is connected to television 117. Set-top box 105 can deliver a video signal for television 117 to display TV programs, shows, movies, etc. Set-top box 105 is connected to distribution network 122. Distribution network can include fiber optic technologies, cable television, satellite television, or other television delivery networks. In some embodiments, distribution network 122 can include headend 125. Set-top box 105 is also connected to a home network router 107, which is connectable to the Internet 120. Router 107 can include wireless functionality and/or use separate access points for wireless transmissions. As shown in FIG. 1, the home network can include multiple IP connected devices 110, which can establish a connection with router 107 either via a wired or wireless communication protocol. In this particular example, IP connected devices include mobile phone 110-4, personal computer 110-3, tablet computer 110-1, and laptop computer 110-2. Note that many other types of electronic devices can connect to the home network and display synchronization content.

In cable, and other video delivery networks such as Fiber-to-the-curb (FTTC), Fiber-to-the-home (FTTH), satellite TV etc., TV signals are transmitted from a service provider's headend through a distribution network and delivered to subscriber's home. Techniques disclosed herein can insert additional contextual data into the programming channel at the headend 125, or other network facility.

Generally, set-top box 107, at customer premises 101, receives a compressed TV signal, decodes the program and displays the selected program on TV. Set-top box 107 can also process a data message inserted (embedded) in the TV signal stream to either display additional information or graphics on a TV, or perform other actions. In the connected home environment, a set-top box can also transmit such data messages to one or more IP connected devices 110, so that synchronized content can be viewed or processed on IP connected devices.

Set-top box 107 can function in a home network with wired and wireless connected devices. Set-top boxes at home can be connected to a home network through built-in Ethernet, Wi-Fi or Multimedia over Coax Alliance (MoCA) interface etc. The embedded data message, (referred to herein as eData) is broadcast to Set-top boxes, that is, to various subscribers of TV program delivery service. A given set-top box receives and processes eData contained in the broadcast signal for its own consumption, and/or transmits eData to IP connected devices on a home network to be displayed or processed. The IP connected devices that are listening can then execute corresponding actions according to the action type included in the data message. For example, a given TV signal includes an embedded URL or other network resource. By way of a non-limiting example, a viewer can be watching a particular news program. Embedded in the particular news program signal sent to the set-top box might be data identifying a website address associated with the particular news program, survey poll results, additional background information on the news program, etc. The set-top box then sends this website address (and/or additional payload data) to the IP device. The IP device can then access a corresponding website, or content on the corresponding website. Techniques disclosed herein include several ways to insert the additional data.

The embedded data can be complete data, or can comprise reference data/data locators to retrieve additional data from an external site or third party server computer. This provides both a push and pull mechanism. For some features, the real data or payload data may be sufficiently small to be transmitted entirely as embedded within the TV signal, while for other features the IP connected device may need to retrieve this data from an external server.

In one example, a single set-top box is being used by a single viewer. The TV (set-top box) is tuned to a particular TV channel or program. The TV signal for this channel carries some embedded information, such as within an electronic program guide (EPG) for this particular channel. When the set-top box detects the embedded information/data (regardless of how it is embedded), the set-top box transmits this eData to an IP connected device, such as via a router or wireless gateway. The eData can be embedded in a TV signal using various techniques. In some embodiments, the eData can be embedded in an MPEG transport stream, while in other embodiments, the eData can be embedded in the EPG. For example, a user switches to a news network channel. Upon switching channels, the EPG data changes, and this EPG data for the news network channel can include the eData embedded within the EPG, which can include a different URL, URI, or real data.

There can be two-way communication between the set-top box and the IP connected device. The IP connected device can signal to the set-top box a request to receive eData for the currently tuned channel. The set-top box can then transmit a unicast, multicast, or broadcast stream to the home network. By joining a corresponding multicast group, the IP connected device can receive the eData from the set-top box. The set-top box pulls the eData from the embedded stream if there are users of a multicast/unicast sync stream. For example, a viewer can launch an application (running on a mobile phone, tablet computer, laptop, etc.), and then any external content (in addition to the eData) can be managed and presented within the application on the IP connected device. Thus, once a subscriber launches the application, the application can sync with the set-top box, and then begin receiving the eData.

The set-top box can identify content that the IP connected device is receiving. IP connected devices can identify one or more set-top boxes within a given home network, and then identify a particular set-top box to use. As a viewer changes channels, the eData content available on the IP connected device can be changed to new content associated with the current channel. Alternatively, the IP connected device application can remain with particular content, or ask the user whether it should switch content pages corresponding to a newly tuned channel. In some embodiments, IP connected devices can get all of audio/video data as well as eData from the set-top box. The embedded data can include real/payload data (such as images and text) as well as network resource identifiers. Data embedded in a TV signal can be very robust depending on where the data is embedded.

The data message can be inserted into a TV program in many ways. For example, it can be inserted into a vertical blanking interval (VBI) field of an analog video signal, modulated to audio stream at a frequency higher than the human ear can detect, inserted into a user data field of MPEG-2 video stream or a data elementary stream of MPEG-2 transport stream, it can be inserted into EPG data, and so forth. When eData is inserted into EPG data, it can be inserted into each grid, so that eData can be different for each different channel and different program.

Figure 2:
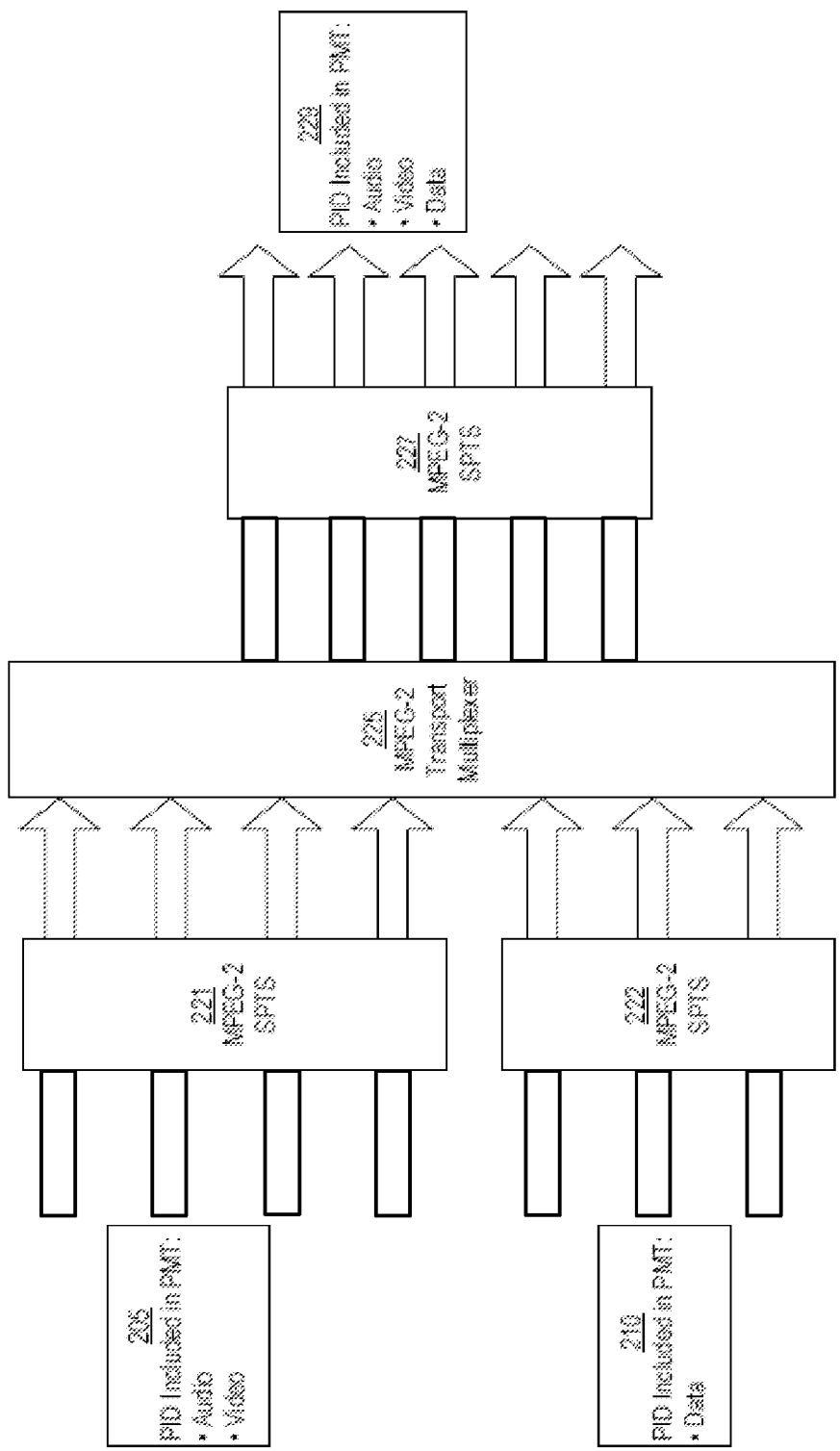
FIG. 2 is a diagram illustrating a process for embedded synchronization data in a television signal according to embodiments herein.

FIG. 2 shows an example of eData as a data elementary stream inserted into a program with audio and video streams. There are two MPEG-2 Single Program Transport Streams (SPTS), 221 and 222, present at the input of mpeg-2 transport multiplexer 225. SPTS 221 contains audio and video 205 elementary streams of a TV program. SPTS 222 contains data elementary stream 210 to be inserted into the TV program. The resulting SPTS 227 at the output of MPEG-2 multiplexer 225 contains audio and video streams 229 from the original TV program, as well as data elementary stream 229 containing the data message. Similarly, data messages can be inserted into a program contained in a multiple program transport stream (MPTS). When eData is inserted into a data elementary stream of MPEG-2 transport stream, the packet identifier (PID) of data stream 210 is included in the Program Map Table (PMT) of the program data inserted. The PID can be identified with a stream descriptor. Each eData message can be inserted once, or repeat multiple times to increase reliability.

More specifically, the following non-limiting example details a technique for embedding data in a particular type of television signal to provide a data message. Note that such techniques can be similarly applied to other types of television signals.

A given data message can include multiple fields. Common structures include: "UTF8String," "AttributeEntry," "AttributeBlock," "Resource," "TargetingAttribute," and "Profile." UTF8String identifies a length of a string. AttributeEntry identifies a name of a parameter or value. AttributeBlock identifies a number of parameters in a parameter block. Resource is an optional resource identifier that uniquely identifies the resource carried in the data block. The resource identifier can be a URI either as URL or URN. A resource can be shared across multiple applications, hence a resourceID requires being globally unique. "VersionNumber" is a 32 bit field that is used to describe the version number for the resource. "ContentType" is a MIME string that helps to identify the type of resource carried in following data block, e.g. URL, HTML, XML, JS, JSON, JPEG, GIF89a, PNG, EBIF. "ContentExpiration" is a 32 bit number that provides the UTC time when the resource should expire. A resource, if cached, should be discarded by the resource past the expiration date/time. "CanBeCached" is a Boolean value where 1 indicates that this resource can be cached for future use, and 0 means this resource is not cacheable. "Attributes" is an optional array of attributes associated with the resource. "DataBlockLen" is the length of the Data Block following this field. "DataBlock" is a block of bytes that comprises the resource to be processed by the receiver. TargetingAttribute identifies a logical predicate before an attribute. Profile identifies a unique identifier used for the Profile that is passed in this structure. Attributes can also refer to a logical combination of attributes.

A data message can includes several fields. "Sync Word" is a 32-bit long field that contains a fixed pattern for finding the beginning of message. For example an integer with value 0x484E4D53 representing character string "HNMS" (Home Network Media Synchronization), which can be used as sync word. "ProtocolVersion" is an 8-bit long field used to specify the version of the protocol used to transmit the message. "Message Length" is a 32-bit long field that indicates a number of bytes included in the message immediately following this field. "OrgId" is a 32-bit long field that specifies the organization ID of the message source. System operators and users at home can use this field to block or allow data messages from particular organizations. The OrgId field follows the Digital Video Broadcasting-Multimedia Home Platform (DVB-MHP) definition of org.Id. "ApplicationId" is a 32 bit long field that specifies the application ID of the message source. Each application ID is unique to an organization (orgID). "ApplicationURL" is a URLString that specifies the location of the application and where to download from. URL can also identify the protocol to be used to access the application. E.g. HTTP, DSMCC, BFS, DC, etc. InstanceId is a 32 bit long field that specifies the specific instance of a given application. An application and/or its resources can be broadcast many times on a network. "InstanceId" is unique to each such broadcast/airing of the application. "Priority" is a 16-bit field that indicates priority of message data. In case of conflict with other existing messages, priority is used to determine if current message should be processed, or ignored. "TargetProfile" is a targeting profile that is described through a series of attributes. A receiver processes this message only if there is a match with the target profile as specified. "MessageType" is a 32 bit identifier that identifies the type of message carried in this message or the type of event communicated to an application. "MessageID" is a 32-bit long field that specifies the message ID. Each message has a unique ID. MessageID is unique to particular application and uniquely identifies the message send to the application. "Message Type" is a 32-bit long field that specifies the message type. A message type helps to notify the receiver on how to process a particular message. "Message Sequence Number" is an 8-bit long field used to specify an instance of a given messageID. A receiver can be used to identify if a message is new or not. "MessageExpiration" is a 32-bit field that specifies expiration time of message and data in UTC. "ServiceContext" is a URL string that describes and identifies the service context currently selected by the receiver and is the source of the message. The service context can be of the type: Broadcast Channel, VOD Session, or DVR Session. The ServiceContext identifiers are domain specific and can be based on Guide Metadata ID, EIDR, ISAN or SCTE35 descriptors. ContentId is a URLString that uniquely identifies the content currently decoded by the receiver and presented on the TV screen. ContentID can help to identify program/series and the episode for the series. Content ID is domain specific and the domain can be passed in the URLString. "ContentID" can be a Guide Metadata ID (TMS, ROVI), EIDR, ISAN or SCTE32 descriptor. "TimeMarker" is a 32 bit time value, in milliseconds, that conveys the current location in the program currently presented. This location is offset from the beginning of the program, which is marked as 0.

"ActionCode" is a 16-bit field indicating what action(s) to be taken when receiving the message. A data message can have many action codes associate with it. For example, actions can be to display, save, email, delete, cancel, don't forward (to IP connected devices), forward, prompt for user interaction, load application, resume application, suspend the application if running, load and run application, keep the application paused, maintain the current state of the application, terminate the current application, as well as other tasks. "ActionCodeParam" is a parameter string that is associated with the action specified above. "ResourcePayLoad" is a structure to carry and convey all the required resources associated with this message or event. These resources can be a text file, markup content (HTML, XML), script code (Javascript, JSON, EBIF), image/graphic resources (PNG, JPEG), sound resources (WAV, AU) etc. . . . and the resource type is communicated with the MIME type string in the resource header. Each resource can be uniquely identified by the global ResourceID string. The resource header also contains fields to describe expiration time for the resource, caching flag, version number, ContentType (MIME field), and an array of other attributes as name/value pairs The set-top box receiver extracts the data message from the broadcast video channel and processes it. The data message extracted can be consumed by set-top box and/or transmitted to other devices connected to home network. The data message can be transmitted through IP broadcast, IP multicast or any IP unicast protocol to IP connected devices on the home network. In case of IP broadcast or IP multicast, an application running on IP connected device can directly register to an IP broadcast/multicast address and port to receive the message.

The communication protocol between the IP connected devices and the set-top box can be based on a subscribe-publish methodology, wherein the application on an IP connected device communicates to the STB through a well-known/pre-defined port and sends a subscribe message to the set-top box, either for all messages or for specific messages based on a message filter specified in the subscribe message. This message filter can be based on a combination of message types, org.Id/appid, priority, etc. Once the set-top box receives a message in the stream, the set-top box will publish (send) the data message to all IP connected devices that are registered for that message type. On receiving the message, the IP connected device processes the message and takes appropriate actions according to the action code included in the data.

The IP connected device can periodically send heartbeat messages to the set-top box to keep the session alive. To end the session, the IP connected device can send an unsubscribe message either for all messages or for specific messages as specified by the message filter in the message. The actual transport protocol used for the communication of the message can be based on prevailing industry specifications such as DLNA, HTTP, etc. Note that many households have more than one set-top box connected on the home network. In this situation, if the transport is based on IP broadcast/multicast, then the IP address and port used for transmitting data on the home network can be either based on a round robin scheme or based on a registry, thereby avoiding multiple set-top boxes using the same broadcast/multicast IP address and port. The communication between the IPCD and STB can also be based on a non-IP network and can be a based on wireless technologies such as Bluetooth, IR, Z10 etc.

Data transmitted to IP connected devices can also be locally generated by an application running on the set-top box, instead of re-transmitting a data message received in video program channel. For example, an application on the set-top box can send the currently tuned channel number and program number to IP connected devices for viewing statistics or for parental control/monitoring purposes. The system can function with Digital Video Recorders (DVR) in that the receiver can preserve and record all the data messages, along with the video channel, either in the same video container format or in a different container format. Upon playback of the recorded content from DVR, the receiver/set-top box can process the data message in the same manner as if tuned to a live broadcast video channel.

Such a media synchronization system has many use cases. For example, conventionally, the emergency alert system (EAS) is broadcast to set-top boxes in TV signals in case of emergency. Viewers who do not have their TV on, however, will not get the EAS messages. Moreover, viewers who watch TV on IP connected devices may not get EAS messages. With techniques herein, EAS can be inserted into TV signals and then transmitted to IP connected devices to reach a broader audience. The system can be used with network DVR services. A URL of current TV programming can be inserted into a TV signal itself as described herein. The DVR application on the set-top box or on IP connected devices can record the URL or use the URL to request actual video and save on local storage for later viewing. Techniques herein can provide supplementary material, which can include actual data, or the URL of supplementary materials can be inserted into TV signals. For example, when watching a movie, data such as an actor's bio, list of other movies this actor has played in, etc., can be inserted into the TV signal for synchronized access. Commercial or coupon information can be added. A coupon code, coupon URL or an actual coupon image can be inserted into a TV signal during commercials. Application on IP connected devices can save the coupon on the device, or email it to a preconfigured email account.

Because IP connected devices are becoming more powerful today (generally more powerful and versatile than conventional set-top box), there are almost no limitations to what kind of applications IP connected devices can support. Other types of applications that this disclosure can support include, but are not limited to, the following: chat/twitter/facebook, voting/polling, viewing statistics, and parental control/monitoring.

Figure 6:
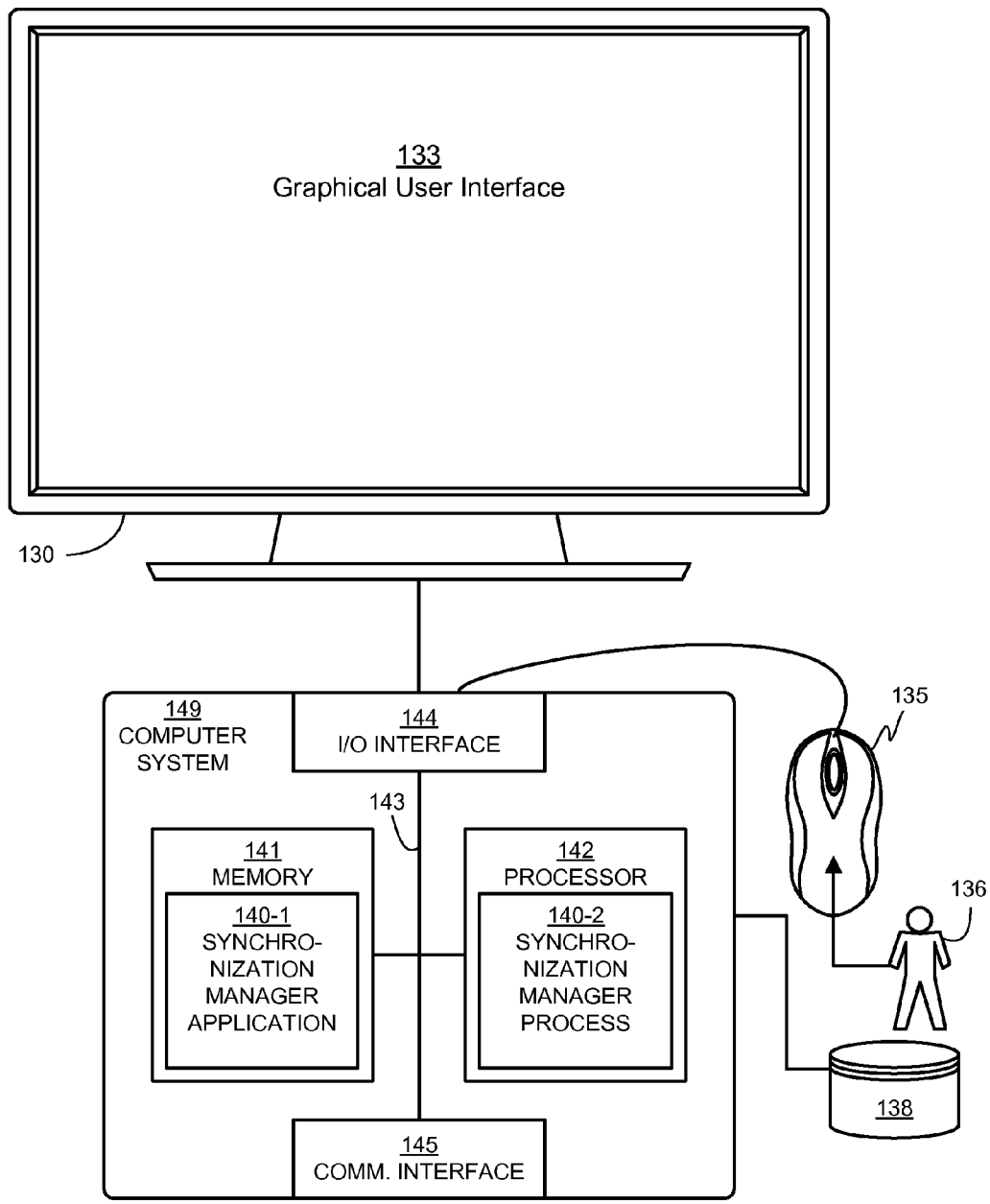
FIG. 6 is an example block diagram of a synchronization manager operating in a computer/network environment according to embodiments herein.

FIG. 6 illustrates an example block diagram of a synchronization manager 140 operating in a computer/network environment according to embodiments herein. Computer system hardware aspects of FIG. 6 will be described in more detail following a description of the flow charts.

Functionality associated with synchronization manager 140 will now be discussed via flowcharts and diagrams in FIG. 3 through FIG. 5. For purposes of the following discussion, the synchronization manager 140 or other appropriate entity performs steps in the flowcharts.

Figure 3:
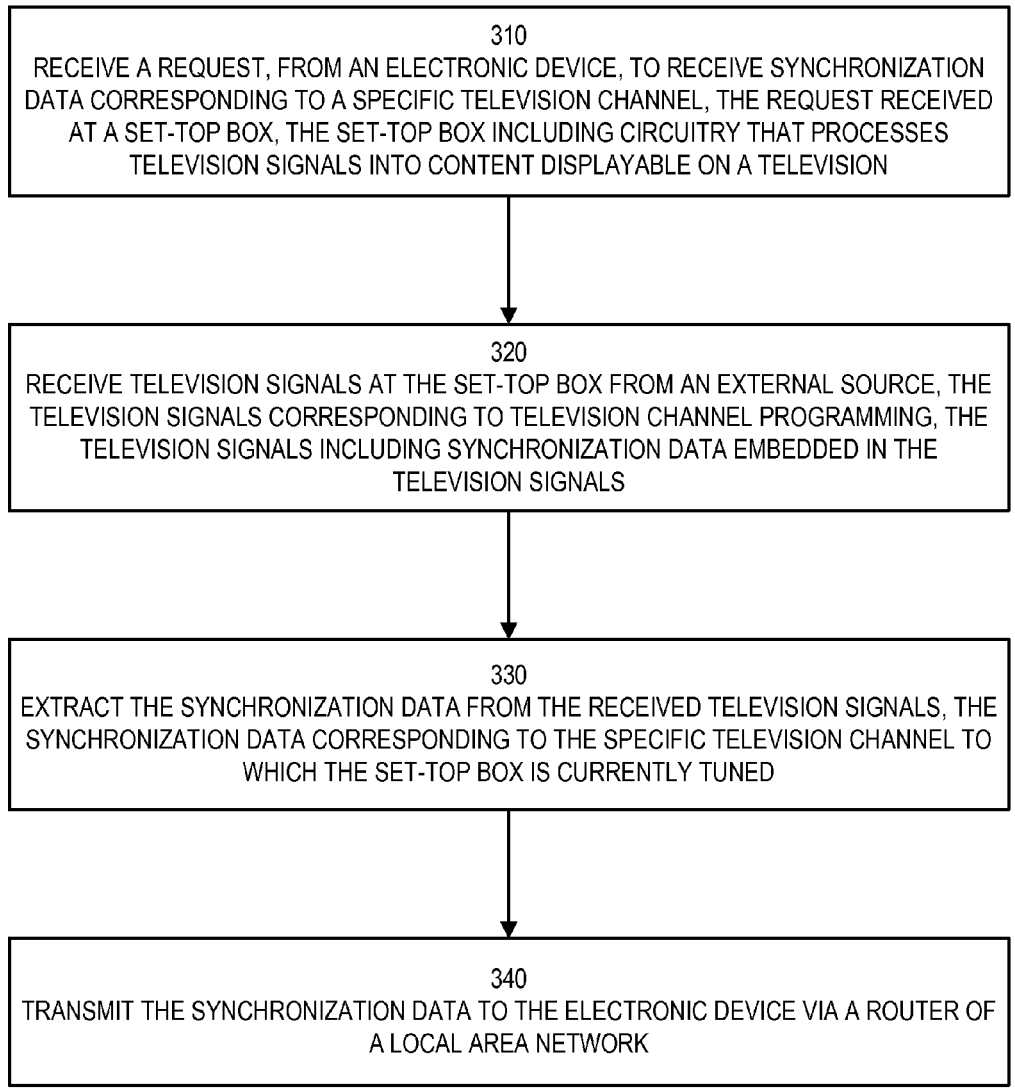
FIG. 3 is a flowchart illustrating an example of a process supporting media synchronization according to embodiments herein.

Now describing embodiments more specifically, FIG. 3 is a flow chart illustrating embodiments disclosed herein. In step 310, synchronization manager receives a request, from an electronic device, to receive synchronization data corresponding to a specific television channel. The request is received at a set-top box. The set-top box including circuitry that processes television signals into content displayable on a television, such as with a conventional television set-top box for cable, satellite, or fiber services.

In step 320, the synchronization manager receives television signals at the set-top box from an external source. The television signals correspond to television channel programming. The television signals include synchronization data embedded in the television signals.

In step 330, the synchronization manager extracts the synchronization data from the received television signals. The synchronization data corresponds to the specific television channel to which the set-top box is currently tuned, that is, the channel/program audio and video that the set-top box is sending to an attached television.

In step 340, the synchronization manager transmits the synchronization data to the electronic device via a router of a local area network or home network, such as using a wired/wireless router.

Figure 4:
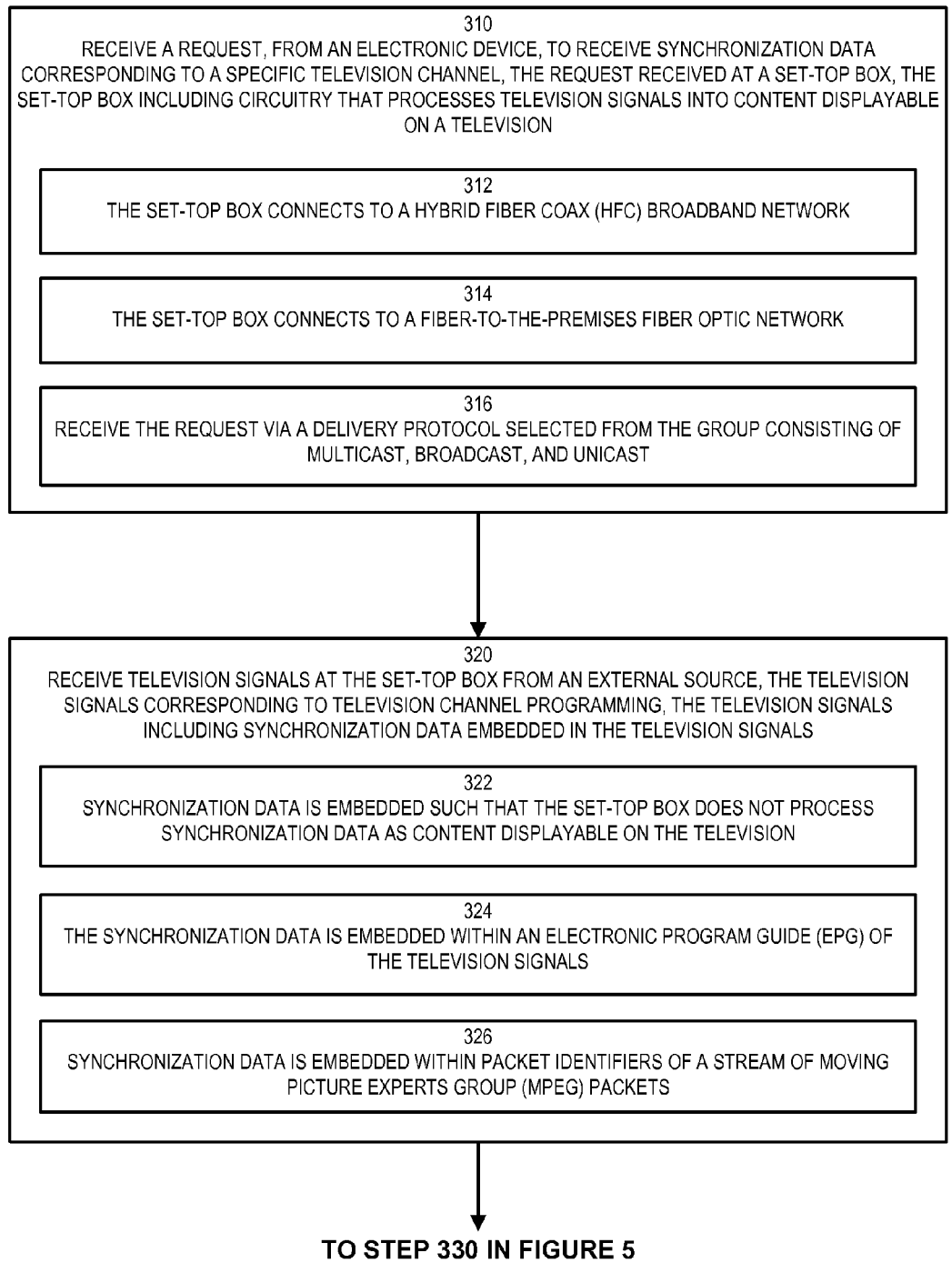
FIGS. 4-5 are a flowchart illustrating an example of a process supporting media synchronization according to embodiments herein.
Figure 5:
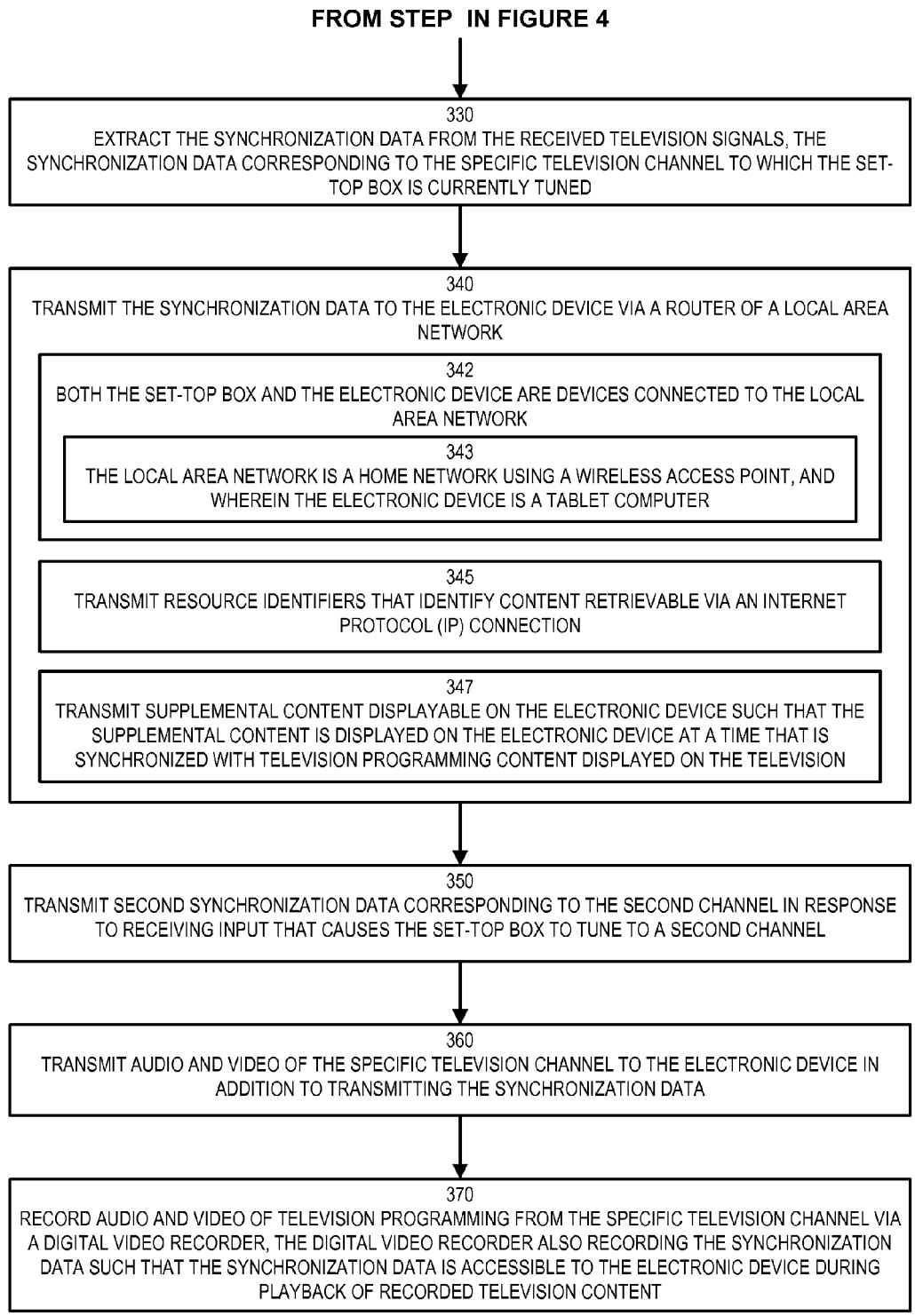

FIGS. 4-5 include a flow chart illustrating additional and/or alternative embodiments and optional functionality of the synchronization manager 140 as disclosed herein.

In step 310, the synchronization manager receives a request, from an electronic device, to receive synchronization data corresponding to a specific television channel. The request is received at a set-top box. The set-top box includes circuitry that processes television signals into content displayable on a television.

In step 312, the set-top box connects to a hybrid fiber coax (HFC) broadband network as source of the television signals. In step 314, the set-top box connects to a fiber-to-the-premises fiber optic network.

In step 316, the set-top box receives the request via a delivery protocol selected from the group consisting of multicast, broadcast, and unicast.

In step 320, the synchronization manager receives television signals at the set-top box from an external source. The television signals correspond to television channel programming. The television signals include synchronization data embedded in the television signals.

In step 322, synchronization data is embedded such that the set-top box does not process synchronization data as content displayable on the television. For example, the set-top box can include instructions (or instructions are included in the embedded data) that prevent the set-top box from trying to convert the synchronization data into content displayable on the television.

In step 324, the synchronization data is embedded within an electronic program guide (EPG) of the television signals. In step 326, the synchronization data is embedded within packet identifiers of a stream of Moving Picture Experts Group (MPEG) packets.

In step 330, the synchronization manager extracts the synchronization data from the received television signals. The synchronization data corresponds to the specific television channel to which the set-top box is currently tuned.

In step 340, the set-top box transmits the synchronization data to the electronic device via a router of a local area network.

In step 342, both the set-top box and the electronic device are devices connected to the local area network. In step 343, the local area network is a home network using a wireless access point, and wherein the electronic device is a tablet computer or other personal electronic device.

In step 345, the set-top box transmits resource identifiers that identify content retrievable via an Internet Protocol (IP) connection.

In step 347, the set-top box transmits supplemental content displayable on the electronic device such that the supplemental content is displayed on the electronic device at a time that is synchronized with television programming content displayed on the television. In other words, the additional media content is approximately synchronized with television program content.

In step 350, the set-top box transmits second synchronization data corresponding to the second channel in response to receiving input that causes the set-top box to tune to a second channel.

In step 360, the set-top box transmits audio and video of the specific television channel to the electronic device in addition to transmitting the synchronization data. Thus, both television programming and additional content can be delivered to the IP connected device for display.

In step 370, the synchronization manager records audio and video of television programming from the specific television channel via a digital video recorder. The digital video recorder also records the synchronization data such that the synchronization data is accessible to the electronic device during playback of recorded television content.

In another embodiment, an IP connected device transmits a request to receive synchronization data corresponding to a specific television channel. The request is transmitted from an electronic device towards a set-top box. The set-top box includes circuitry that processes television signals into content displayable on a television. The electronic device includes circuitry that connects to an IP network and displays multimedia content. The IP connected device receives synchronization data from the set-top box via a router of a local area network. The synchronization data has been embedded in a television signal, received at the set-top box, corresponding to the specific television channel to which the set-top box is tuned. The IP connected device then displays the content, from the synchronization data, on the electronic device such that the displayed content appears synchronized with audio and video content of television programming corresponding to the specific television channel. The synchronization content can be tied to a specific television channels. For example, in response to receiving the set-top box tuning to a second or different channel, the electronic device receives second synchronization data corresponding to the second channel and displays content from the second synchronization data on the electronic device.

Continuing with FIG. 6, the following discussion provides a basic embodiment indicating how to carry out functionality associated with the synchronization manager 140 as discussed above. It should be noted, however, that the actual configuration for carrying out the synchronization manager 140 can vary depending on a respective application. For example, computer system 149 can include one or multiple computers that carry out the processing as described herein.

In different embodiments, computer system 149 may be any of various types of devices, including, but not limited to, a cell phone, a personal computer system, desktop computer, laptop, notebook, or netbook computer, mainframe computer system, handheld computer, workstation, network computer, router, network switch, bridge, application server, storage device, a consumer electronics device such as a camera, camcorder, set top box, mobile device, video game console, handheld video game device, or in general any type of computing or electronic device.

Computer system 149 is shown connected to display monitor 130 for displaying a graphical user interface 133 for a user 136 to operate using input devices 135. Repository 138 can optionally be used for storing data files and content both before and after processing. Input devices 135 can include one or more devices such as a keyboard, computer mouse, microphone, etc.

As shown, computer system 149 of the present example includes an interconnect 143 that couples a memory system 141, a processor 142, I/O interface 144, and a communications interface 145.

I/O interface 144 provides connectivity to peripheral devices such as input devices 135 including a computer mouse, a keyboard, a selection tool to move a cursor, display screen, etc.

Communications interface 145 enables the synchronization manager 140 of computer system 149 to communicate over a network and, if necessary, retrieve any data required to create views, process content, communicate with a user, etc. according to embodiments herein.

As shown, memory system 141 is encoded with synchronization manager 140-1 that supports functionality as discussed above and as discussed further below. Synchronization manager 140-1 (and/or other resources as described herein) can be embodied as software code such as data and/or logic instructions that support processing functionality according to different embodiments described herein.

During operation of one embodiment, processor 142 accesses memory system 141 via the use of interconnect 143 in order to launch, run, execute, interpret or otherwise perform the logic instructions of the synchronization manager 140-1. Execution of the synchronization manager 140-1 produces processing functionality in synchronization manager process 140-2. In other words, the synchronization manager process 140-2 represents one or more portions of the synchronization manager 140 performing within or upon the processor 142 in the computer system 149.

It should be noted that, in addition to the synchronization manager process 140-2 that carries out method operations as discussed herein, other embodiments herein include the synchronization manager 140-1 itself (i.e., the un-executed or non-performing logic instructions and/or data). The synchronization manager 140-1 may be stored on a non-transitory, tangible computer-readable storage medium including computer readable storage media such as floppy disk, hard disk, optical medium, etc. According to other embodiments, the synchronization manager 140-1 can also be stored in a memory type system such as in firmware, read only memory (ROM), or, as in this example, as executable code within the memory system 141.

In addition to these embodiments, it should also be noted that other embodiments herein include the execution of the synchronization manager 140-1 in processor 142 as the synchronization manager process 140-2. Thus, those skilled in the art will understand that the computer system 149 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing descriptions of embodiments of the invention are not intended to be limiting. Rather, any limitations to embodiments of the invention are presented in the following claims.

The invention claimed is:

1. A computer-implemented method for media synchronization, the computer-implemented method comprising:
   receiving, at a set-top box from an electronic device, a request to receive at least one data message corresponding to a specific television channel to which the set-top box is tuned;
   receiving television signals at the set-top box from an external source, the television signals corresponding to television channel programming, the television signals including the data message embedded in the television signals, the data message including synchronization data;
   extracting the data message including the synchronization data from the received television signals; and
   transmitting audio and video of the specific television channel and the data message including the synchronization data from the set-top box to the electronic device for display,
   wherein transmitting the synchronization data to the electronic device includes transmitting resource identifiers that identify content retrievable via an Internet Protocol (IP) connection, the resource identifiers including at least:
      a first uniform resource locator (URL) string for a location of an application, the application being operative to manage and present, within the application, at least content from the data message corresponding to the synchronization data; and a second URL string for displayable content, the second URL string corresponding to a source of the content from the data message corresponding to the synchronization data.

2. The computer-implemented method of claim 1, further comprising:
in response to receiving input that causes the set-top box to tune to a second channel, transmitting second synchronization data corresponding to the second channel.

3. The computer-implemented method of claim 1, wherein transmitting the synchronization data includes transmitting supplemental content displayable on the electronic device such that the supplemental content is displayed on the electronic device at a time that is synchronized with television programming content displayed on a television.

4. The computer-implemented method of claim 1, wherein the synchronization data is embedded such that the set-top box does not process synchronization data as content displayable on a television.

5. The computer-implemented method of claim 1, wherein receiving the request includes receiving the request via a delivery protocol selected from the group consisting of multicast, broadcast, and unicast.

6. The computer-implemented method of claim 1, wherein the synchronization data is embedded within an electronic program guide (EPG) of the television signals.

7. The computer-implemented method of claim 1, wherein the synchronization data is embedded within packet identifiers of a stream of Moving Picture Experts Group (MPEG) packets.

8. The computer-implemented method of claim 1, wherein both the set-top box and the electronic device are devices connected to a local area network.

9. The computer-implemented method of claim 8, wherein the local area network is a home network using a wireless access point, and wherein the electronic device is a tablet computer.

10. The computer-implemented method of claim 1, further comprising:
recording audio and video of television programming from the specific television channel via a digital video recorder, the digital video recorder also recording the synchronization data such that the synchronization data is accessible to the electronic device during playback of recorded television content.

11. The computer-implemented method of claim 1, wherein the set-top box connects to a hybrid fiber coax (HFC) broadband network.

12. The computer-implemented method of claim 1, wherein the set-top box connects to a fiber-to-the-premises fiber optic network.

13. A computer system for media synchronization, the computer system comprising:
a processor; and
a memory coupled to the processor, the memory storing instructions that, when executed by the processor, cause the system to perform the operations of:
receiving, at a set-top box from an electronic device, a request to receive at least one data message corresponding to a specific television channel to which the set-top box is tuned;
receiving television signals at the set-top box from an external source, the television signals corresponding to television channel programming, the television signals including the data message embedded in the television signals, the data message including synchronization data;
extracting the data message including the synchronization data from the received television signals; and
transmitting audio and video of the specific television channel and the data message including the synchronization data from the set-top box to the electronic device for display,
wherein transmitting the synchronization data to the electronic device includes transmitting resource identifiers that identify content retrievable via an Internet Protocol (IP) connection, the resource identifiers including at least:
a first uniform resource locator (URL) string for a location of an application, the application being operative to manage and present, within the application, at least content from the data message corresponding to the synchronization data; and
a second URL string for displayable content, the second URL string corresponding to a source of the content from the data message corresponding to the synchronization data.

14. The computer system of claim 13, wherein the memory stores further instructions that, when executed by the processor, cause the system to perform the operation of:
in response to receiving input that causes the set-top box to tune to a second channel, transmitting second synchronization data corresponding to the second channel.

15. The computer system of claim 13, wherein transmitting the synchronization data includes transmitting supplemental content displayable on the electronic device such that the supplemental content is displayed on the electronic device at a time that is synchronized with television programming content displayed on a television.

16. The computer system of claim 13, wherein the synchronization data is embedded such that the set-top box does not process synchronization data as content displayable on a television.

17. The computer system of claim 13, wherein the data message includes a first field containing the synchronization data, the synchronization data including a pattern for finding a beginning of the data message.

18. The computer system of claim 17, wherein the data message further includes two or more of:
a second field for specifying a version of a protocol used to transmit the data message;
a third field for indicating a number of bytes included in the data message;
a fourth field for specifying an application identifier of a source of the data message;
a fifth field for specifying an instance identifier of the application;
a sixth field for specifying a targeting profile for the data message;
a seventh field for specifying a message identifier of the data message;
an eighth field for specifying an instance of a particular message identifier;
a ninth field for identifying a service context for the data message;
a tenth field for indicating a current time location in the displayable content;
an eleventh field for specifying at least one action to be taken when receiving the data message; and
a twelfth field for specifying a parameter string associated with the at least one action.

19. A computer-implemented method for media synchronization, the computer-implemented method comprising:

transmitting, from an electronic device towards a set-top box, a request to receive at least one data message corresponding to a specific television channel to which the set-top box is tuned;

receiving, at the electronic device from the set-top box, audio and video of the specific television channel and the data message including synchronization data, the synchronization data having been embedded in and extracted from a television signal received at the set-top box, the television signal corresponding to the specific television channel to which the set-top box is tuned; and displaying, on the electronic device, the audio and video of the specific television channel and content from the data message, such that the displayed content appears synchronized with the audio and video content of the specific television channel, wherein receiving, at the electronic device, the synchronization data includes transmitting resource identifiers that identify content retrievable via an Internet Protocol (IP) connection, the resource identifiers including at least:

a first uniform resource locator (URL) string for a location of an application, the application being operative to manage and present, within the application, at least content from the data message corresponding to the synchronization data; and a second URL string for displayable content, the second URL string corresponding to a source of the content from the data message corresponding to the synchronization data.

20. The computer-implemented method of claim 19, further comprising:

in response to receiving the set-top box tuning to a second channel, receiving second synchronization data corresponding to the second channel and displaying content from the second synchronization data on the electronic device.

* * * * *